March 27, 1945.   H. H. RINGGER   2,372,638
TRACTOR OPERATED SWEEP RAKE
Filed Sept. 22, 1942
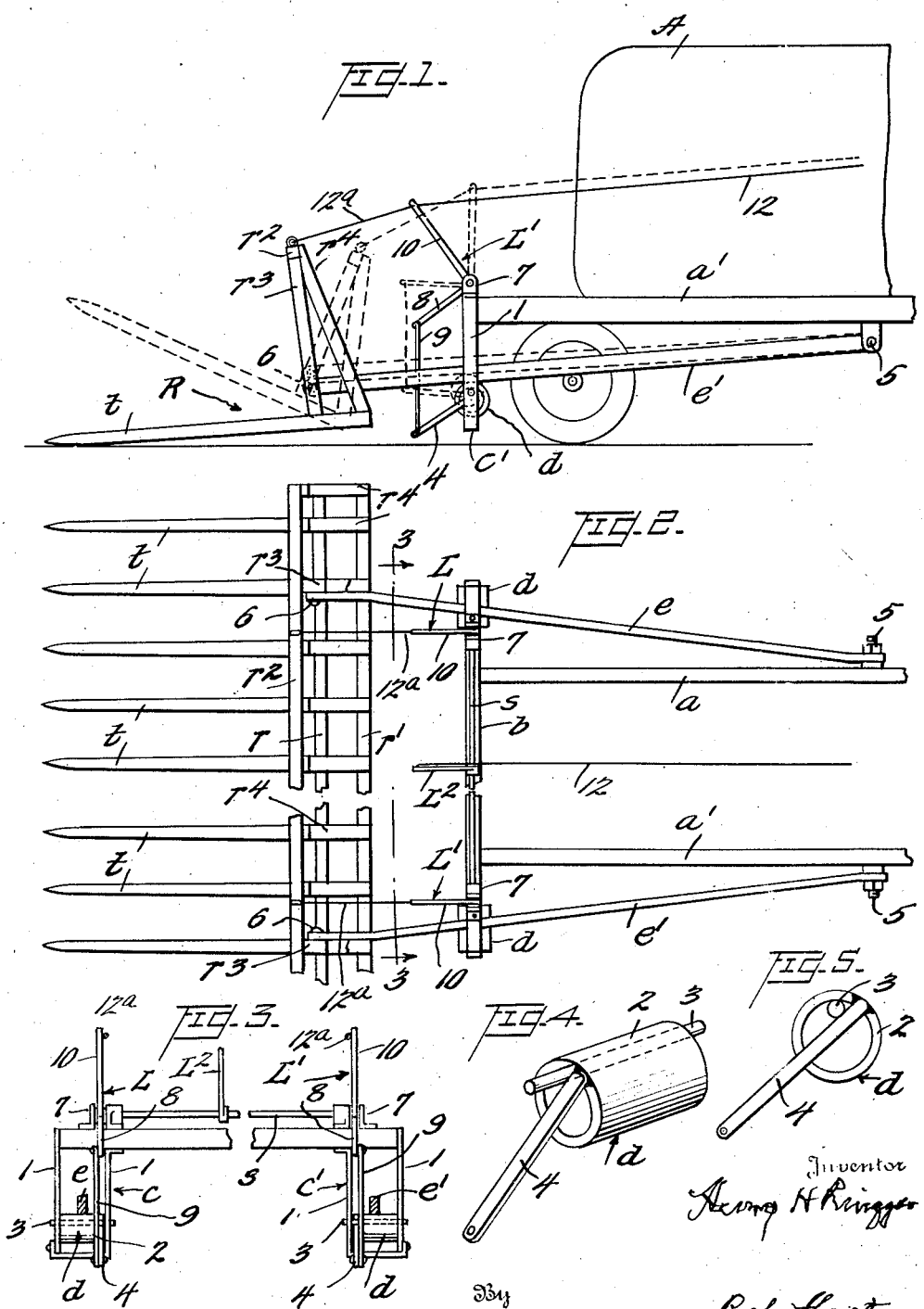

Patented Mar. 27, 1945

2,372,638

UNITED STATES PATENT OFFICE 2,372,638

TRACTOR OPERATED SWEEP RAKE

Henry H. Ringger, Gridley, Ill., assignor to Gridley Farm Tool Company, Incorporated, Gridley Ill., a corporation of Illinois Application September 22, 1942, Serial No. 459,318

1 Claim. (Cl. 56—361)

This invention relates to tractor-operated sweep rakes, and principally to a simple and effective means for lifting the rake bodily from the raking position to the load-carrying position, or for lowering it from the latter position to the raking position.

In the accompanying drawing,

Figure 1 is a side view of the rake and part of the tractor, the rake being shown in full lines in the raking position and, in dotted lines in the carrying position;

Figure 2 is a top plan view of the rake and its supporting means, partly broken away;

Figure 3 is a cross section on the line 3—3 of Figure 2;

Figure 4 is a perspective view of one of the cams upon which the push bars rest and the lever for rotating the cam, and Figure 5 is an end view of the parts shown in Figure 4.

Referring to the drawing, A represents a tractor, $a$ and $a'$ represent side bars suitably secured to the tractor frame and projecting forwardly from the tractor and $b$ is a cross bar secured to the forward ends of the side bars and extending at a right angle thereto and beyond said bars. Brackets $c$ and $c'$ depend from the ends of the cross bar $b$ each bracket comprising parallel flat rods $l$ connected together at their lower ends, and, journaled in the brackets, are cams $d$. As shown in Figures 4 and 5, each cam comprises a short section of cylindrical metal tubing 2 to the inner surface of which is welded a shaft 3 which extends parallel with the axis of the cylinder and beyond its ends, and these shafts are journaled in the brackets, as shown in Figure 3. Thus the cylinders are eccentrically mounted and constitute cams. Each cylinder 2 has a crank arm 4 welded to one of its ends, the arm extending diametrically across the end of the cylinder to which it is attached.

Push bars $e$ and $e'$, pivoted at their rear ends to the side bars $a$ and $a'$, respectively, as shown at 5, extend forwardly through the brackets $l$ and rest on the cams $d$ so that by moving the arms 4 the cams may be moved to raise or lower the forward ends of the push bars.

The rake R is of usual form, comprising a head consisting of parallel bars $r$ and $r'$, to the under sides of which the rear ends of the teeth $t$ are attached, the top bar $r^2$, supported above the bar $r$ by a series of vertical struts $r^3$, and a corresponding number of brace rods $r^4$ extending from the cross bar $r'$ to the top bar $r^2$. The forward ends of the push bars are pivotally connected to certain of the struts $r^3$, near the lower ends of the latter, as shown at 6.

A rock shaft $s$ is mounted in bearings 7 on the cross piece $b$ and extends parallel with the cross piece. Secured to the shaft, near its ends, are bell-crank levers L and L'. The lower arm 8 of each bell-crank lever is connected by a rod 9 with the cam lever 4 immediately below it, while the upper arm 10 of each bell-crank lever is connected by a cable 12a to the top bar of the rake head. A lever $L^2$ is secured to the central part of the shaft $a$ and a cable 12 secured to this lever, extends rearwardly to the mechanism convenient to the driver's seat for drawing the cable rearwardly to rock the shaft $s$ in one direction or for releasing the cable so as to permit said shaft to rock in the opposite direction, the mechanism not being shown in the drawing.

The operation is as follows: During the raking period the cable is released and the parts are in the positions shown in full lines in Figure 1, with the rake teeth resting on the ground and the pusher bars resting on the cams immediately over the cam shafts 3. When the cable 12 is pulled rearwardly it rocks the shaft $s$ and the bell-cranks L and L', secured to the shaft, are rocked to the dotted position, the arm 8 of each bell-crank lever, through its connection with the cam lever 4 immediately below it, causing the cam to turn and lift the forward end of the pusher bar resting on that cam. At the same time, the arms 10 of the bell crank levers through their connections 12a with the top of the rake, will cause the rake to swing about its pivotal connections with the push-bars to the carrying position shown in dotted lines. When the operator desires to cause the movement of the rake from the carrying position to its position in engagement with the ground, he releases the tension on the cable and the rake then swings about its vertical connection with the push bars, causing the bell-crank levers, through their connections with the cam levers, to apply pressure to the cam levers tending to turn them in the direction to lower the ends of the push bars and the weight of the push bars applied to the eccentrically mounted cams, together with the weight of the rake, insures the return of the push bars to their lowermost positions, with the rake in contact with the ground.

What I claim is:

In a tractor-operated sweep rake, a tractor frame, two pusher bars pivotally supported at their rear ends by the tractor frame and extending forwardly, cams carried by said tractor frame and supporting the forward ends of said bars, a rake pivotally connected to the forward ends of said bars and manually controlled means for simultaneously rocking the rake about its pivotal axis away from the ground and for moving the cams to raise the forward ends of the pusher bars.

HENRY H. RINGGER.